(12) United States Patent
Murata et al.

(10) Patent No.: US 6,596,375 B2
(45) Date of Patent: Jul. 22, 2003

(54) OPTICAL SHEET AND PRODUCTION PROCESS THEREOF

(75) Inventors: Makoto Murata, Shizuoka (JP); Kensaku Higashi, Shizuoka (JP)

(73) Assignee: Tomoegawa Paper Co., Tokyo (JP)

( * ) Notice: Subject to any disclaimer, the term of this patent is extended or adjusted under 35 U.S.C. 154(b) by 11 days.

(21) Appl. No.: 09/811,602

(22) Filed: Mar. 20, 2001

(65) Prior Publication Data

US 2001/0033913 A1 Oct. 25, 2001

(30) Foreign Application Priority Data

Mar. 23, 2000 (JP) .................................... 2000-081620
Jun. 9, 2000 (JP) .................................... 2000-172962

(51) Int. Cl.$^7$ ................................................ B32B 5/16
(52) U.S. Cl. ................ 428/144; 428/143; 428/323; 428/332; 156/279; 156/280; 427/164; 427/180; 427/202
(58) Field of Search ................. 428/323, 332, 428/143, 144; 422/169, 180, 202; 359/619, 620; 156/279, 280

(56) References Cited

U.S. PATENT DOCUMENTS 4,505,967 A  * 3/1985 Bailey ........................ 428/164
6,204,971 B1 * 3/2001 Morris et al. ............... 359/619
6,383,558 B1 * 5/2002 Fujiwara et al. ............ 427/164

FOREIGN PATENT DOCUMENTS

JP         2000-171618          6/2000

* cited by examiner

Primary Examiner—Paul Thibodeau
Assistant Examiner—Christopher Paulraj
(74) Attorney, Agent, or Firm—McDermott, Will & Emery

(57) ABSTRACT

The invention provides an optical sheet suitable for use in displays such as LCD and EL and having good light transmission property and diffusiveness and moreover possessing excellent durability that the optical properties of the optical sheet can be retained even under high-temperature and high-humidity conditions. The optical sheet has a transparent substrate and a binder layer laminated directly or through another layer on the transparent substrate, wherein spherical fine particles having a particle diameter distribution of from 0.8 to 1.0 are embedded in a state of a monoparticle layer in the binder layer so as to partly project from the surface of the binder layer, and a distance from the top of the projected fine particles to the surface of the transparent substrate is from 100% to 110% of the volume average particle diameter of the spherical fine particles.

6 Claims, 4 Drawing Sheets

OPTICAL SHEET AND PRODUCTION PROCESS THEREOF

BACKGROUND OF THE INVENTION

1. Field of the Invention

The present invention relates to an optical sheet suitably used in displays such as LCD, EL and FED and particularly having excellent effects on prevention of luminance irregularity, improvement in contrast and widening of angle of field.

2. Description of the Background Art

Displays such as LCD, EL and FED have been remarkably developed in recent years. In particular, LCD is spread in all fields such as note type personal computers and portable terminals and expected for the future. This LCD is classified into reflection type and transmission type by how to take light for illuminating a liquid crystal panel thereinto. The reflection type is a system that a reflection plate, on which an aluminum film, silver or the like having a high reflectivity has been stuck, is arranged on the back surface of a liquid crystal panel, and light which is struck on it from the surface side of the display is reflected by the reflection plate to illuminate the liquid crystal display, thereby obtaining a liquid crystal image. On the other hand, the transmission type is a system that the liquid crystal panel is illuminated by a back light unit arranged on the back surface of the liquid crystal panel. In order to prevent contrast from being deteriorated by the ground color of the aluminum or silver in the LCD of the reflection type, it is conducted to interpose a medium that moderately diffuses light between the liquid crystal panel and the reflection plate to bring the background color near to a paper white color. In order to prevent visibility from being deteriorated by a light-scattering printing pattern formed on an acrylic light guide plate making up the back light unit in the transmission type LCD on the other hand, it is so constructed that a medium that moderately diffuses light is interposed between the liquid crystal panel and the back light unit to illuminate the liquid crystal panel by uniform surface light.

As described above, the light diffusing medium (hereinafter referred to as "light diffuser") is generally used in both systems of the reflection type and transmission type. As such light diffusers, are known an interior light diffuser that fine particles are dispersed in a binder resin to diffuse light in the interior of a layer, an exterior light diffuser that the surface of a resin layer is roughened for form irregularities in the surface, thereby diffuse light on the surface, and an interior-exterior light diffuser that light is diffused both in the interior and on the exterior. Japanese Patent Application No. 350446/1998 proposes that among those corresponding to the interior exterior light diffuser, a light diffuser, in which spherical fine particles are arranged in a state of a monoparticle layer on the surface of a resin layer, is lessened in loss of transmitted light by backward diffusion to achieve high transmittance and diffusiveness.

However, the light diffuser with the spherical fine particles arranged in the state of a monoparticle layer on the surface has involved a problem that its optical properties are gradually changed under high-temperature and high humidity conditions, and its blocking with another member occurs, thereby causing uneven light scattering, color irregularity and the like because a pressure sensitive adhesive is used as a binder resin. Moreover, the control of optical properties such as light transmittance, diffusiveness and haze is conducted by the height of the spherical fine particles projecting from the binder layer. The pressure sensitive adhesives forming the binder layer flows out at a high temperature or with time, and so stable optical properties have not been achieved, and the control has been difficult.

SUMMARY OF THE INVENTION

The present invention has been made with the foregoing circumstances in view. Namely, it is an object of the present invention to provide an optical sheet having a high light transmittance and good diffusiveness and possessing excellent durability that such optical properties can be retained for a long period of time even under high-temperature and high-humidity conditions.

Another object of the present invention is to provide an optical sheet raising no blocking and a production process thereof.

The present inventors have carried out an extensive investigation as to improvement in the stability to optical properties. As a result, it has been found that the optical properties are changed under high-temperature and high-humidity because spherical fine particles undergo a change, for example, sinking of the fine particles in a direction of a substrate due to the flow of a pressure sensitive adhesive, and that blocking occurs because a pressure sensitive adhesive used in a binder layer comes into contact with another member. The present inventors have also found that spherical fine particles are bonded directly or through a very thin binder to a substrate in a state of a monoparticle layer, thereby preventing the spherical fine particles from sinking into the binder to provide an optical sheet having high light transmittance and diffusiveness and also having high stability to optical properties. The present invention has been led to completion on the basis of these findings.

According to a first aspect of the present invention, there is thus provided an optical sheet comprising a transparent substrate and a binder layer laminated directly or through another layer on the transparent substrate, wherein spherical fine particles having a particle diameter distribution of 0.8 to 1.0 are embedded in a state of a monoparticle layer in the binder layer so as to partly project from the surface of the binder layer, and a distance from the top of the projected fine particles to the surface of the transparent substrate is from 100% to 110% of the volume average particle diameter of the spherical fine particles.

In this aspect, a protective layer or a layer capable of improving light diffusiveness may be provided on the surface of the binder layer in which the spherical fine particles have been embedded.

According to a second aspect of the present invention, there is also provided an optical sheet comprising a transparent substrate, and a binder layer and a protective layer successively laminated on the substrate, wherein spherical fine particles are embedded in the protective layer in such a manner that at least a part of each spherical fine particle comes into contact with the binder layer in a state of a monoparticle layer, and a part of each spherical fine particle projects from the surface of the protective layer to form a projected portion or form a projected portion in a state covered with the protective layer.

As described above, the protective layer is provided in such a manner that the spherical fine particles are projected from the surface of the protective layer in the state that the spherical fine particles are embedded therein, or projected portions are formed by the fine particles on the surface of the protective layer, whereby an optical sheet, which has such excellent stability that the optical properties thereof do not vary according to environmental conditions and the like, causes no blocking and permits easily controlling haze to a desired value, can be provided.

A first aspect of the process for producing the optical sheet of the second aspect according to the present invention comprises the steps of forming a binder layer composed of a material having stickiness on a transparent substrate, attaching spherical fine particles in a state of a monoparticle layer on the surface of the binder layer, and providing a protective layer on the binder layer, on which the spherical fine particles have been attached, in such a manner that projected portions by the spherical fine particles are formed on the surface thereof.

A second aspect of the process for producing the optical sheet of the second aspect according to the present invention comprises the steps of forming a binder layer composed of a material having stickiness on a transparent substrate, providing a protective layer on the binder layer, attaching spherical fine particles on the surface of the binder layer to form a monoparticle layer, and embedding the spherical fine particles in the protective layer by a pressing medium in such a manner that at least a part of each spherical fine particle comes into contact with the binder layer, and a part of each spherical fine particle projects from the surface of the protective layer.

Figure 1:
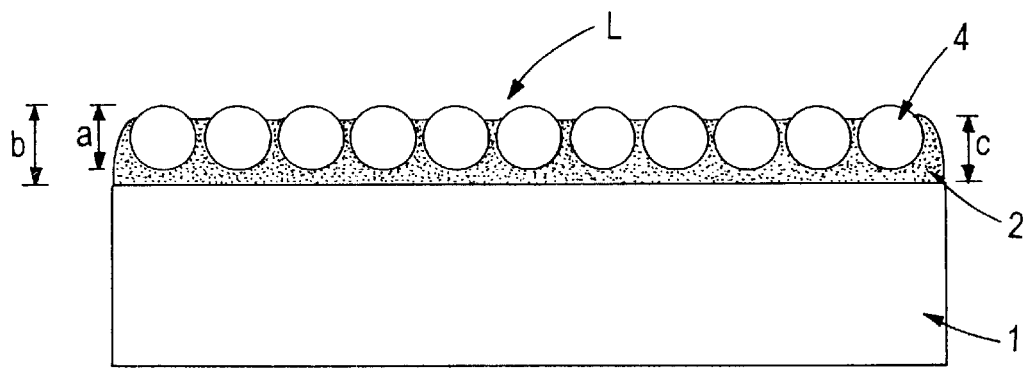
FIG. 1 is a cross-sectional view typically illustrating an exemplary optical sheet according to the first aspect of the present invention.

In the drawings, meanings of reference characters are as follows:

1 . . . transparent substrate, 2 . . . binder layer, 3 . . . protective layer, 4 . . . spherical fine particle, 5 . . . back light unit, 6 . . . polarizing plate, 7 . . . liquid crystal cell, L . . . optical sheet, a . . . volume average particle diameter of the spherical fine particles, b . . . distance from the top of the projected fine particles to the surface of the transparent substrate, and c is thickness of the binder layer.

DETAILED DESCRIPTION OF THE PREFERRED EMBODIMENTS

The optical sheet according to the first aspect of the present invention will be first described. In FIG. 1, an optical sheet L comprises a transparent substrate 1 and a binder layer 2 bonded directly to the transparent substrate 1. In this optical sheet L, a great number of spherical fine particles 4 are embedded in the binder layer in a state of a monoparticle layer at a high density in a planar direction and without overlapping one another in a thicknesswise direction so as to partly project from the surface of the binder layer.

Uniform light diffusiveness and light transmission property by virtue of the spherical fine particles can be sufficiently achieved by embedding the spherical fine particles in such a manner. Incidentally, the term "state of a monoparticle layer" as used herein means a state that the spherical fine particles are arranged in a plane as evenly as possible without overlapping one another in the thicknesswise direction of the binder layer.

In the optical sheet according to the first aspect of the present invention, a distance (b in FIG. 1) from the top of the projected fine particles to the surface of the transparent substrate must be from 100% to 110% of the volume average particle diameter (a in FIG. 1) of the spherical fine particles. Such a distance is almost 100% of the volume average particle diameter in minimum because the spherical fine particles are not embedded into the transparent substrate. If the distance exceeds 110%, a resin in the binder layer existing between the spherical fine particles and the transparent substrate is too great, and so the stability to optical properties under high-temperature and high-humidity conditions is deteriorated to fail to achieve sufficient optical properties from the viewpoint of practical use.

Figure 2:
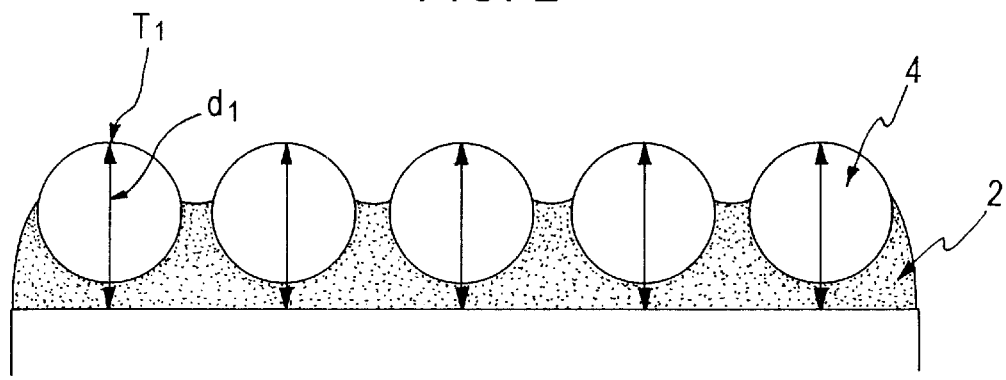
FIG. 2 typically illustrates a measurement site of a distance from the top of the projected fine particles to the surface of the transparent substrate.

In the present invention, "the distance from the top of the projected fine particles to the surface of the transparent substrate" corresponds to $d_1$ in FIG. 2 and a value measured by the following method. In FIG. 2, reference characters 2 and 4 mean a binder layer and spherical fine particles, respectively, as described above. The optical sheet is first frozen with liquid nitrogen and then divided into two portions at an optional position. Using a photograph of the section thereof, 5 spherical fine particles are chosen at random from the photograph. A straight line $d_1$ is drawn from the top of the projected portion $T_1$ of each spherical fine particle so as to cross at right angles with a boundary line between the transparent substrate and the binder layer, thereby measuring the length of the straight line $d_1$. An average of this value is regarded as the distance from the top of the projected fine particles to the surface of the transparent substrate.

The particle diameter distribution of the spherical fine particles is preferably within a range of from 0.8 to 1.0, more preferably from 0.9 to 1.0, because the embedded depth of the spherical fine particles in the binder layer becomes even as the particle diameter distribution is narrower.

The term "particle diameter distribution" as used herein is defined by the following equation. The particle diameter distribution comes near to 1.0 as particles become more monodisperse. In complete monodisperse particles, the par- $$\text{Particle diameter distribution} = \frac{\text{(number average particle diameter)}}{\text{(volume average particle diameter)}}$$

The number average particle diameter means an average value of diameters of 100 spherical fine particles extracted at random from a microphotograph of the spherical fine particles.

The volume average particle diameter is determined in the following manner. The volumes of the individual spherical fine particles are first found from the diameters obtained in the measurement of the number average particle diameter with each spherical fine particle regarded as a true sphere. The total volume of 100 spherical fine particles is then calculated out by accumulating the volumes of the individual spherical fine particles. Thereafter, the volumes are accumulated in the order of volume from the spherical fine particle of the smallest volume to the spherical fine particles of the greatest volume, and a diameter of a particle at the time the accumulated volumes reaches 50% of the total volume is regarded as the volume average particle diameter. Incidentally, when the spherical fine particles is not a true sphere, its length is regarded as the diameter of the spherical fine particle.

The thickness (c in FIG. 1) of the binder layer is desirably within a range of from 10 to 90%, preferably from 30 to 80% of the diameter of the spherical fine particles in order to prevent the spherical fine particles being separated from the binder layer and projecting from the surface of the binder layer to permit the resulting optical sheet to develop light diffusiveness with certainty.

Figure 3:
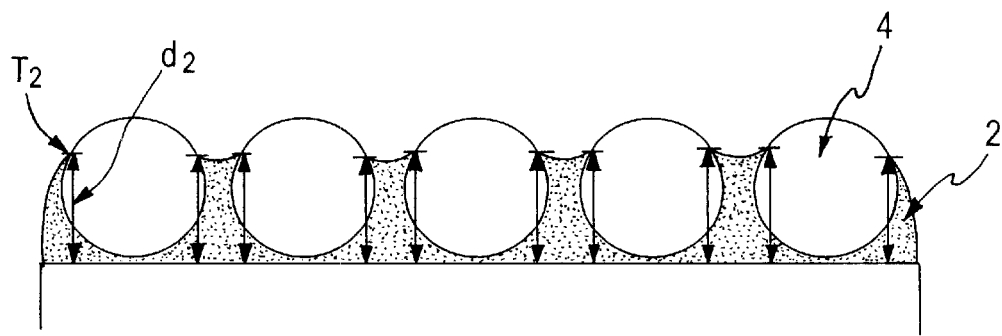
FIG. 3 typically illustrates a measurement site of the binder layer of the optical sheet according to the first aspect of the present invention.

"The thickness of the binder layer" in the present invention is obtained by measuring $d_2$ in FIG. 3 and means a value measured by the following method. In FIG. 3, reference characters 2 and 4 mean a binder layer and spherical fine particles, respectively, as described above. First of all, 5 spherical fine particles are extracted at random from the photograph of the section of the optical sheet. A straight line $d_2$ is drawn from a point $T_2$, at which the binder layer comes into contact with the spherical fine particle 4, so as to cross at right angles with a boundary line between the transparent substrate and the binder layer, thereby measuring the length of the straight line $d_2$. This measurement is conducted on left and right sides of each projected portion of the five spherical fine particles, and an average value at 10 points in total is regarded as the thickness of the binder layer.

In order to establish such embedded form of the spherical fine particles as described above in the present invention, the glass transition temperature (hereinafter referred to as "Tg") of a resin used in the binder layer is desirably from −65 to −15° C. If Tg is lower than −65° C., the resulting binder layer becomes too soft, and so it is difficult to prevent the optical properties from varying. If Tg is higher than −15° C., the resulting binder layer becomes too hard, and so it is difficult to embed the spherical fine particles therein, resulting in a failure to firmly keep them therein. Incidentally, Tg in the present invention is a value determined by measuring a dynamic viscoelasticity of the resin (using Rheovibron DDV-II manufactured by Orientex Co.) to find the maximum value of Tan δ, thereby regarding this value as Tg.

A protective layer may be provided on the binder layer in which the spherical fine particle have been embedded. In this case, more stabilized optical characteristics are obtained and occurrence of blocking can be prevented.

Figure 4:
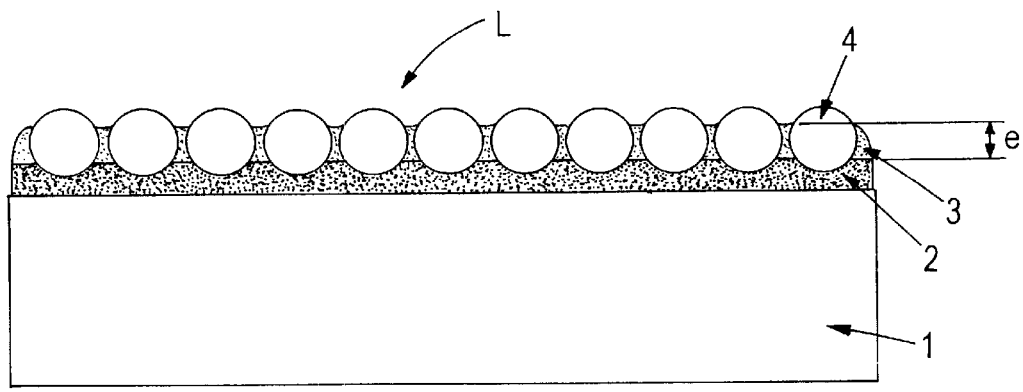
FIG. 4 is a cross-sectional view typically illustrating an exemplary optical sheet according to the second aspect of the present invention.
Figure 5:
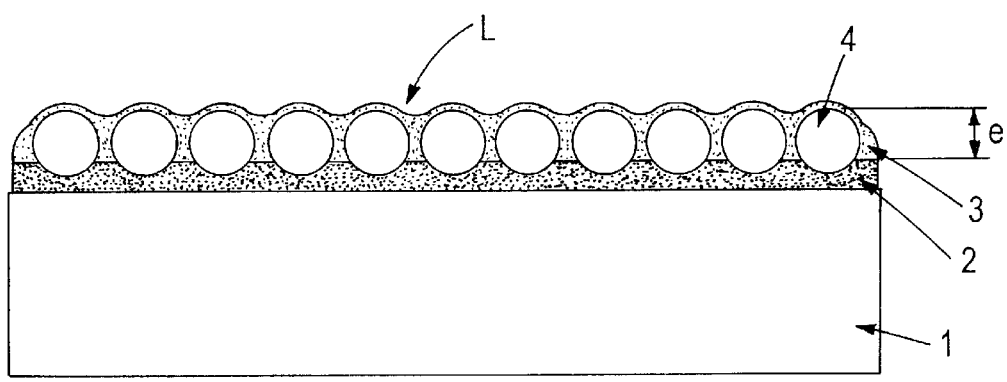
FIG. 5 is a cross-sectional view typically illustrating another exemplary optical sheet according to the second aspect of the present invention.

The optical sheet according to the second aspect of the present invention will now be described. In FIGS. 4 and 5, an optical sheet L comprises a transparent substrate 1, a binder layer 2 laminated on the transparent substrate and a protective layer 3 laminated on the binder layer 2 so as to cover at least the binder layer. In such an optical sheet, a great number of spherical fine particles 4 are embedded in the binder layer and protective layer in a state of a monoparticle layer at a high density in a planar direction and without overlapping one another in a thicknesswise direction. In the case of the optical sheet illustrated in FIG. 4, a part of each spherical fine particle 4 projects from the surface of the protective layer 3 without being covered with the protective layer 3 to form a projected portion. In the case of the optical sheet illustrated in FIG. 5, the spherical fine particles 4 are covered with the protective layer 3 to form projected portions.

Figure 6:
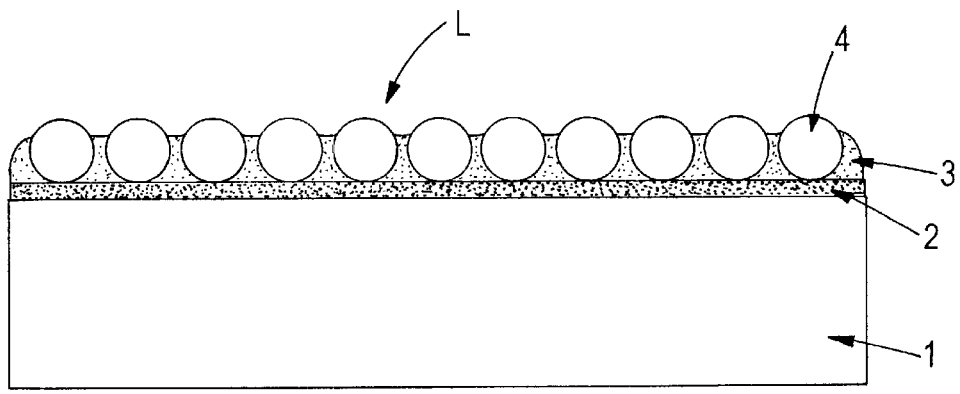
FIG. 6 is a cross-sectional view typically illustrating a further exemplary optical sheet according to the second aspect of the present invention.
Figure 7:
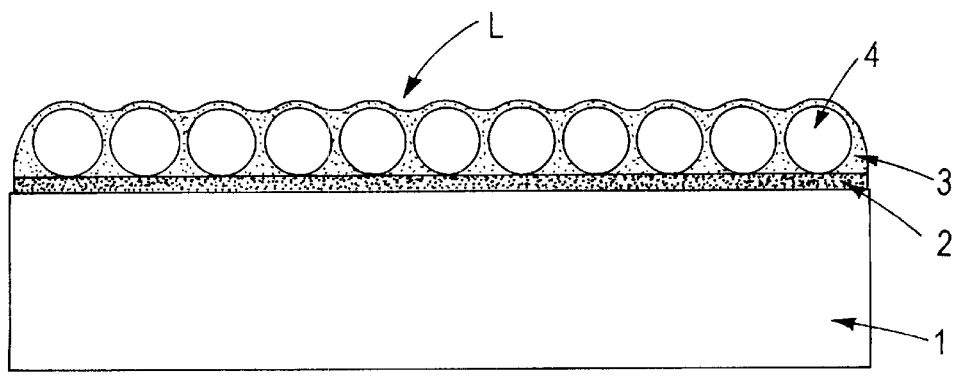
FIG. 7 is a cross-sectional view typically illustrating a still further exemplary optical sheet according to the second aspect of the present invention.

In FIGS. 4 and 5, a part of the individual spherical fine particles are embedded in the binder layer in a state of the monoparticle layer. However, the spherical fine particles may be kept in a state coming into contact with (attaching to) the binder layer as illustrated in FIGS. 6 and 7. More specifically, in the optical sheet L according to the second aspect, the binder layer 2 is laminated on the transparent substrate 1, and the protective layer 3 is laminated on the binder layer 2 so as to cover at least the binder layer. A great number of spherical fine particles 4 come into contact with the binder layer at a high density in a planar direction and without overlapping one another in a thicknesswise direction to form a monoparticle layer. In the case of the optical sheet illustrated in FIG. 6, a part of each spherical fine particle 4 projects from the surface of the protective layer 3 without being covered with the protective layer 3 to form a projected portion. In the case of the optical sheet illustrated in FIG. 7 on the other hand, the spherical fine particles 4 are covered with the protective layer 3 to form projected portions.

In the optical sheets according to the second aspect of the present invention, as illustrated in FIGS. 4 to 7, the protective layer is provided so as to at least cover the binder layer at the portions not covered with the spherical fine particles arranged on the surface in the state of the monoparticle layer. Therefore, the spherical fine particles are fixed to achieve stable optical properties. The occurrence of blocking is prevented by this protective layer, and moreover optical properties such as light transmittance, diffusiveness and haze can be controlled with ease by controlling the material composition, thickness, form (whether the spherical fine particles are covered or not) and the like of the protective layer.

In the optical sheets according to the second aspect of the present invention, with respect to the particle diameter distribution of the spherical fine particles, and the glass transition temperature of a resin used in the binder layer, those within the respective ranges described in the optical sheets according to the first aspect are preferably used. In the optical sheets according to the second aspect of the present invention, the thickness of the binder layer is preferably from 0.1 to 2 times as much as the particle diameter of the spherical fine particles embedded therein. If the thickness of the binder layer is thinner than 0.1 times as much as the particle diameter of the spherical fine particles, the spherical fine particles tend to separate upon attaching the spherical fine particles to the binder layer. Therefore, such a small thickness is not preferable. If the thickness is greater than 2 times as much as the particle diameter on the other hand, the stability to the optical properties may possibly be deteriorated. Therefore, such a great thickness is not preferable. However, a distance from the top of the projected fine particles to the surface of the transparent substrate is preferably from 100% to 110% of the volume average particle diameter of the spherical fine particles. In this case, the average height from the surface of the transparent substrate to the top of the spherical fine particles is close to the volume average particle diameter of the spherical fine particles. Therefore, when the optical sheet after formation of the monoparticle layer was stored in a state wound or overlapped prior to providing the protective layer, the spherical fine particles are not further embedded. Accordingly, since the optical properties do not vary, there are advantages that a period of time between the step of embedding the spherical fine particles and the next step of providing the protective later may be optionally preset, which is extremely useful for design of production, and that the optical sheet can be stored for a long period of time in a wound state after providing the protective layer.

Materials suitable for use in constituting the optical sheets according to the present invention will now be described.

As the transparent substrate in the present invention, may be used a transparent film. More specifically, may be suitably used any film of various resin films formed of polyethylene terephthalate (PET), polyethylene naphthalate (PEN), triacetyl cellulose (TAC), polyarylate, polyimide, polyether, polycarbonate, polysulfone, poly(ether sulfone), cellophane, polyamide, polyethylene, polypropylene, polyvinyl alcohol or the like. The present invention is not limited to such films, and resin plates formed of such a resin, or sheet-like members formed of a glass material such as quartz glass or soda glass may also be used.

As the transparent substrate, any translucent substrate may be used so far as it transmits light. However, a transparent substrate having a refractive index (JIS K 7142) within a range of from 1.42 to 1.60 is desirable when the resulting optical film is used in a liquid crystal display or the like. As specific examples thereof, may be mentioned films formed of triacetyl cellulose (TAC) or an acrylic resin such as polymethyl methacrylate. The transparency of these transparent substrate is preferably higher, and so a substrate having a light transmittance (JIS C 6714) of at least 80%, more preferably at least 85% and a haze (JIS K 7105) of at most 3.0, more preferably at most 1.0, most preferably at most 0.5 may be suitably used. When the optical sheet is used in a small and light-weight liquid crystal display, the transparent substrate is preferably a film, and the thickness thereof is desirably thinner from the viewpoint of weight saving. However, a film having a thickness within a range of from 0.5 μm to 1 mm is preferably used taking the productivity into consideration. A light-condensing or diffusing lens may also be formed on one side of the transparent substrate on the side opposing to the binder layer.

The binder layer of the present invention is composed mainly of a resin, and any resin used in various kinds of pressure sensitive adhesives may be used. As the pressure sensitive adhesive, that having tackiness necessary for attaching the spherical fine particles at an ordinary temperature is preferred. However, any resin may be used so far as it has excellent binding power to the transparent substrate and spherical fine particles.

As examples of the pressure sensitive adhesive, may be mentioned pressure sensitive adhesives such as polyester resins, epoxy resins, polyurethane resins, silicone resins and acrylic resins. These resin binders may be used either singly or in any combination thereof. In particular, the acrylic resin type pressure sensitive adhesive is preferred because it is excellent in water resistance, heat resistance and light fastness, good in adhesive strength and transparency and easy to control its refractive index so as to match taking properties such as anti-reflecting property into consideration. As examples of the acrylic resin type pressure sensitive adhesive, may be mentioned homopolymers of acrylic monomers such as acrylic acid and esters thereof, methacrylic acid and esters thereof, acrylamide, and acrylonitrile, copolymers thereof, and copolymers of at least one of the acrylic monomers with vinyl acetate, maleic anhydride, or an aromatic vinyl monomer such as styrene. Preferred is a copolymer of a main monomer developing tackiness, such as ethylene acrylate, butyl acrylate or 2-ethylhexyl acrylate, a monomer used as a component for cohesive power, such as vinyl acetate, acrylonitrile, acrylamide, styrene, methacrylate, methyl acrylate, and a functional group-containing monomer capable of improving adhesive strength and imparting a starting point of crosslinking, such as methacrylic acid, acrylic acid, itaconic acid, hydroxyethyl methacrylate, hydroxypropyl methacrylate, dimethylaminoethyl methacrylate, dimethylaminomethyl methacrylate, acrylamide, methylolacrylamide, glycidyl methacrylate or maleic anhydride.

In the pressure sensitive adhesive, one or more of crosslinking agents of, for example, the metal chelate type, isocyanate type or epoxy type may be used as a hardening agent in combination as needed. The binder layer may be formed by using an UV-curable binder obtaining by adding a photo-polymerizable monomer, oligomer or polymer and a photo-polymerization initiator.

The resin used in the binder layer of the present invention preferably has Tg within a range of from −65 to −15° C. as described above. If Tg is lower than −65° C., the resulting binder layer becomes too soft, and so the spherical fine particles attached once are separated by impact or the like under high-temperature and high-humidity conditions in particular to facilitate occurrence of defects such as color irregularity. In addition, the resin adheres to the spherical fine particles separated once, and such spherical fine particles may adhere again to other spherical fine particles to adversely affect optical properties in some cases. The fixing of the spherical fine particles becomes insufficient upon the production of the optical sheet, and it is difficult to provide the spherical fine particles in the state of the monoparticle layer on the binder layer, and so the light transmission property of the resulting optical sheet is deteriorated. It is hence not preferable that Tg is too low. On the other hand, any resin having Tg higher than −15° C. is not preferable because the spherical fine particles are easy to separate due to its insufficient tackiness.

The binder layer is preferably formed by such a resin as described above so as to give adhesive strength (JIS Z 0237-8) of at least 100 g/25 mm from the viewpoint of practical use. If the adhesive strength is lower than 100 g/25 mm, separation of the spherical fine particles occurs, and the environmental resistance of the resulting optical sheet is deteriorated. Under high-temperature and high-humidity conditions in particular, there is a possibility that the binder layer may separate from the transparent substrate. The holding power (JIS Z 0237-11) of the binder layer is preferably at most 0.5 mm. If the holding power is greater than 0.5 mm, the binder layer becomes soft, and so the spherical fine particles tend to form plural layers as described above.

Using a resin as a main component forms the protective layer. The resin used must be non-tacky. The term "non-tacky" means that the protective layer becomes tack-free at an ordinary temperature after drying and hardening. A heat- or photo-curable resin or thermoplastic resin is suitably used. As examples of these resins, may be mentioned polyester, polyamide, polyvinyl alcohol, polyurethane, polystyrene, polyacetal, polycrabonate, acrylic resins, epoxy resins and silicone resins. Among others, an acrylic resin is preferred for the same reasons as described in the binder layer. In particular, an acrylic ultraviolet-curable resin may be preferably used in both first and second production processes according to the present invention, which will be described subsequently. These resins may be used either singly or in any combination thereof.

The thickness of the protective layer (e in FIGS. 4 and 5) may be freely determined within limits not completely embedding the spherical fine particles (a state that projected portions by the spherical fine particles are filled to make the surface of the protective layer even) but to 0.1 times of the particle diameter of the spherical fine particles. It is preferably in a range of from 0.1 to 0.9 times, particularly 0.3 to 0.7 times of the particle diameter of the spherical fine particles in order to achieve excellent optical properties and stability thereof. The height (see FIGS. 4 and 6) of the spherical fine particles projecting from the protective layer, or the height (see FIGS. 5 and 7) of projected portions on the surface of the protective layer can be adjusted by controlling the thickness within this range to easily control the optical properties. If the thickness of the protective layer is not smaller than a thickness that the spherical fine particles are completely embedded, the surface form of the resulting optical sheet becomes even, and there is a possibility that the function as an interior-exterior light diffuser may be impaired.

The spherical fine particles used in the present invention preferably have a refractive index within a range of from 1.42 to 1.60 because high light transmission property can be achieved. As such spherical fine particles, may be used, for example, an inorganic pigment such as silica or alumina, or an organic fine particles of an acrylic resin, polystyrene resin, styrene-acrylic copolymer, polyethylene resin, epoxy resin, silicone resin, polyfluorovinylidene, polytetrafluoroethylene, divinylbenzene resin, phenolic resin, urethane resin, cellulose acetate, nylon, cellulose, benzoguanamine resin, melamine resin or the like. However, organic fine particles are preferred from the viewpoints of light transmission property and adhesion to the binder layer, with acrylic resin beads or silicone resin beads being particularly preferred from the viewpoint of light fastness. The particle diameter thereof is preferably in a range of from 1 to 50 $\mu$m, and more particularly from 2 to 10 $\mu$m in the case where the resulting optical sheet is used in a liquid crystal display or the like in particular.

The particle diameter distribution of the spherical fine particles used in the present invention is preferably within a range of from 0.8 to 1.0, more preferably from 0.9 to 1.0 because the embedded depth of the spherical fine particles in the binder layer or protective layer becomes even as the particle diameter distribution is narrower to achieve far excellent optical properties.

As other layers, may be provided, for example, an adjustment layer for adjusting the refractive index of and transmission property to light as an outermost layer, or an adhesive layer for firmly bonding the substrate to the binder layer, as needed.

The production processes of the optical sheets according to the present invention will now be described. The optical sheet according to the first aspect of the present invention can be produced in the following manner. Namely, a coating formulation, in which a resin forming the above-described binder layer is dissolved in a proper solvent, is first applied directly or through another layer on one side or both sides of a transparent substrate and dried to form a binder layer. As the method of application, there are coating methods such as air doctor coating, bar coating, blade coating, knife coating, reverse coating, transfer roll coating, gravure roll coating, kiss coating, cast coating, spray coating, slot orifice coating, calender coating, electrodeposition coating, dip coating and die coating, wand printing methods, such as relief printing such as flexographic printing, direct gravure printing, intaglio printing such as offset gravure printing, lithographic printing such as offset printing, and stencil printing such as screen printing. A coating method using a roll coater is particularly preferred because a uniform layer thickness is obtained. In order to age the binder layer, the binder layer may be subjected to a heat treatment at a temperature of from 20 to 80° C. for from 3 to 14 days in a state that the binder layer has been protected by a releasing PET film or the like before transferring to the next step.

The spherical fine particles are then attached on the surface of the binder layer on the transparent substrate. As a method for the attachment, may be adopted a method such as direct spraying of the spherical fine particles on the binder layer, spraying by an air sprayer, transferring from a brush or roll to which the spherical fine particles are attached, or coating of the spherical fine particles dispersed in a solvent. Fluidization dip coating using a fluidized bed is particularly preferred because the spherical fine particles are uniformly attached. The spherical fine particles may be simply attached to the surface of the binder layer by the tack strength of the binder layer.

Thereafter, the spherical fine particles attached are pressed to be embedded in the binder layer. As a means for pressing, is adopted impact blow by a press roller made of rubber or pressing medium. The pressing must be evenly conducted to the spherical fine particles attached to the binder layer. Therefore, it is preferable to use spherical particles as the pressing medium and impact the spherical fine particles by vibration. The size of the pressing medium is suitably selected according to the particle diameter and material of the spherical fine particles. However, it is generally preferable to have a size of about 0.3 to 2.0 mm.

Excessive spherical fine particles as attached to the binder layer without being embedded in the binder layer are washed out by running water or the like to obtain the optical sheet according to the present invention. In order to age the spherical fine particles embedded and the binder layer, they may be subjected to a heat treatment at a temperature of from 20 to 80° C. for from 3 to 14 days.

The optical sheet according to the second aspect of the present invention can be produced in accordance with the following two processes.

In the first and second production processes, as a first step, a coating formulation, in which a resin having tackiness to such an extent that the spherical fine particles can be attached thereto is dissolved in a proper solvent, is first applied on one side or both sides of a transparent substrate and dried to form a binder layer. As a method of application, may be used that described in the production of the optical sheet according to the first aspect. The binder layer may be suitably aged according to the pressure sensitive adhesive used after the formation thereof before transferring to the next step.

In the first production process according to the second aspect of the present invention, the spherical fine particles are attached to the surface of the binder layer on the transparent substrate as a second step. The attachment may be conducted in the same manner as in the case of the optical sheet according to the first aspect.

Thereafter, the spherical fine particles attached are embedded in the binder layer by the same pressing means as described above to form a monoparticle layer of the spherical fine particles. The degree of the embedding may be suitably controlled according to the desired optical properties.

In the step of embedding the spherical fine particles, excessive spherical fine particles as attached to the binder layer without being embedded in the binder layer are present, and so they are removed by washing with running water or the like to form a monoparticle layer. In order to age the binder layer, a heat treatment is then preferably conducted.

When the spherical fine particles are not required to be embedded from the viewpoint of the desired optical properties, and it is only necessary for the spherical fine particles to simply adhere to the surface of the binder layer, the embedding by pressing in the above-described step may be omitted to transfer to the next step of forming a protective layer after only the removal of the excessive spherical fine particles is conducted.

Lastly, as a third step, the protective layer is provided on the binder layer in such a manner that projected portions by the spherical fine particles are formed on the surface. The procedure thereof is as follows. Namely, a coating formulation, in which a resin for the protective layer is dissolved in a proper solvent, is applied on the binder layer and dried, and hardening by heating or UV irradiation is conducted, as needed, to form the protective layer. At this time, the protective layer is required to form projected portions by the spherical fine particles on the surface thereof. More specifically, the protective layer is formed to such a thickness that a part of each spherical particle is exposed to be left as a projected portion (FIGS. 4 and 6), or the protective layer is formed in such a manner that even when it covers the surfaces of the spherical fine particles, the projected form thereof is left (FIGS. 5 and 7). The optical sheet according to the second aspect of the present invention can thus be produced.

In the second production process of the second aspect in the present invention, after the binder layer is formed in the above-described manner, the protective layer is formed without attaching the spherical fine particles. Thereafter, the spherical fine particles are attached to the surface of the protective layer and embedded in such a manner that a part of each spherical fine particle attached projects from the surface of the protective layer to form a projected portion. The removal of excessive spherical fine particles is then conducted, thereby producing the optical sheet according to the second aspect. The method for embedding such spherical fine particles and the method for removing the excessive spherical fine particles are the same as in the first production process.

In the optical sheets according to the first aspect of the present invention, the average height from the surface of the transparent substrate to the top of the projected portions of the spherical fine particles is close to the volume average particle diameter of the spherical fine particles. Therefore, the spherical fine particles are not further embedded upon storing the optical sheet in a state wound or overlapped. Accordingly, changes in the optical properties can be prevented, and so the stability to the optical properties is higher than the conventional optical sheets, and excellent reliability can be achieved.

In the optical sheets according to the second aspect of the present invention, since the protective layer is provided on the binder layer, the resulting optical sheet is high in stability to the optical properties and blocking resistance, and excellent in reliability. In addition, the laminated state of the protective layer is suitably controlled, whereby the resulting optical sheet can be easily controlled to the desired optical properties. Therefore, the optical sheet has merits from the viewpoints of optical properties and productivity.

Figure 10:
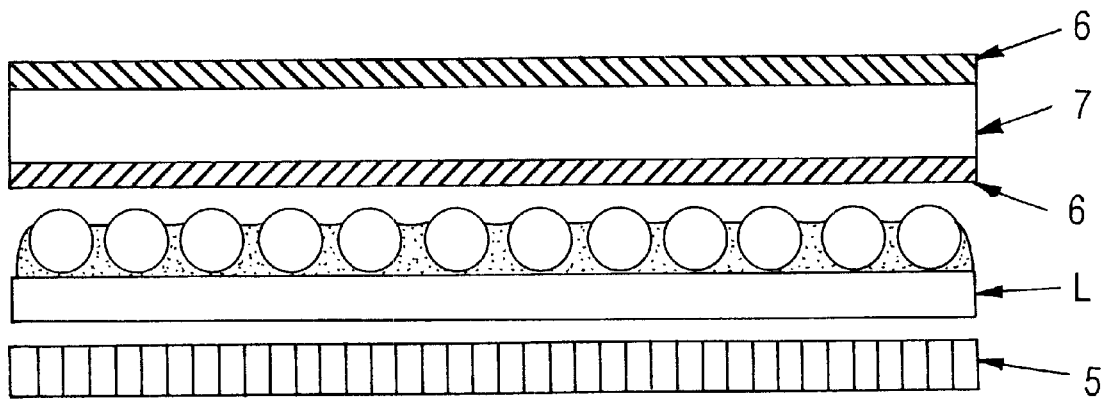
FIG. 10 typically illustrates an exemplary liquid crystal display using the optical sheet according to the first aspect of the present invention.
Figure 11:
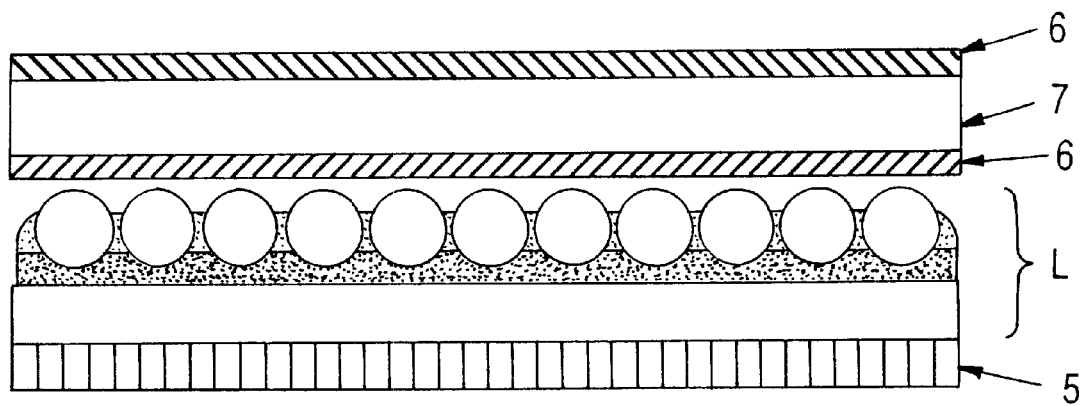
FIG. 11 typically illustrates an exemplary liquid crystal display using the optical sheet according to the second aspect of the present invention.

Accordingly, in, for example, a transmission type liquid crystal display, the optical sheet L according to the present invention is interposed between a back light unit 5 and a liquid crystal cell 7 held between polarizing plates 6 as illustrated in FIGS. 10 and 11, whereby light from the back light unit can be efficiently diffused while efficiently transmitting the light. Since the optical sheet is excellent in the stability to optical properties, stable performance can be imparted to the liquid crystal display over a long period of time even under high-temperature and high-humidity conditions.

The optical sheets according to the present invention can be applied to various kinds of displays and the like not limited to LCD and widely applied in uses of which optical stability is required over a long period of time, and hence have extremely excellent effects.

EXAMPLES

The present invention will hereafter be described by specific examples.

A. Synthesis of Polyacrylate:

Synthesis Example 1

Butyl acrylate (62 parts), methyl acrylate (28 parts), methyl methacrylate (5 parts), azobisisobutyronitrile (2 parts) and toluene (200 parts) were placed in a three-necked flask to polymerize them at 60° C. for 5 hours while stirring them. A bifunctional isocyanate (trade name: D-90, product of Soken Chemical & Engineering Co., Ltd.; 0.3 parts) was added to the reaction mixture to prepare Polyacrylate (a).

After Polyacrylate (a) was applied to a releasing PET by an applicator roll so as to give a dry film thickness of 20 μm, a releasing PET was laminated thereon, and Polyacrylate a was solidified with liquid nitrogen to produce a sheet. There after, this sheet was cut into dimensions of 4×0.5 cm to measure a dynamic viscoelasticity thereof by means of a Rheovibron DDV-II (manufactured by Orientex Co.), thereby regarding the maximum value of Tan δ as Tg. As a result, Tg was −34° C.

Synthesis Example 2

2-Ethylhexyl acrylate (92 parts), acrylic acid (8 parts), azobisisobutyronitrile (2 parts) and toluene (200 parts) were placed in a three-necked flask to polymerize them at 60° C. for 5 hours while stirring them, thereby preparing Polyacrylate (b).

Tg of this Polyacrylate (b) was measured by the same method as in Synthesis Example 1 and was found to be −11° C.

B. Production of Optical Sheet:

Example 1

As a transparent substrate, was used a triacetyl cellulose film (trade name: Fujitack UVD80, refractive index: 1.49, total light transmittance: 92.4%, haze: 0.15, product of Fuji Photo Film Co., Ltd.) having a thickness of 80 μm. Polyacrylate (a) was applied on to one side of this film by a reverse coater so as to give a dry film thickness of 1.5 μm and then dried at 100° C. for 2 minutes. Thereafter, aging was conducted at 60° C. for 7 days to form a binder layer.

As spherical fine particles, were used methylsilicone fine particles (trade name: Tospearl 145, product of GE Toshiba Silicone Co., Ltd.) having a volume average particle diameter of 4.5 μm and a particle diameter distribution of 0.94. The transparent substrate, on which the binder layer had been formed, was passed through a fluidized bed in which the spherical fine particles had been contained, thereby attaching the spherical fine particles to the binder layer.

Further, truly spherical zirconia spheres having a particle diameter of 0.5 mm were placed as a pressing medium in a container, and the transparent substrate, to which the spherical fine particles had been attached, was immersed in this container while vibrating this container, thereby embedding the spherical fine particles in the binder layer. After washing is conducted to remove excessive spherical fine particles, aging was conducted for 7 days in a thermostat controlled to 60° C., and the binder layer was cooled to ordinary temperature to obtain an optical sheet according to Example 1.

Example 2

The same binder as used in Example 1 was applied on to one side of the same film as used in Example 1 by a reverse coater so as to give a dry film thickness of 3 μm and then dried at 100° C. for 2 minutes. Thereafter, aging was conducted at 60° C. for 7 days to form a binder layer. Thereafter, the process was performed in the same manner as in Example 1 except that the spherical fine particles used were changed to polymethyl methacrylate fine particles (trade name: MX-1000, product of Soken Chemical & Engineering Co., Ltd.) having a volume average particle diameter of 10.8 μm and a particle diameter distribution of 0.94, thereby obtaining an optical sheet according to Example 2.

Example 3

The same binder as used in Example 1 was applied on to one side of the same film as used in Example 1 by a reverse coater so as to give a dry film thickness of 1 μm and then dried at 100° C. for 2 minutes. Thereafter, aging was conducted at 60° C. for 7 days to form a binder layer. Thereafter, the process was performed in the same manner as in Example 1 except that the spherical fine particles used were changed to methylsilicone beads (trade name: Tospearl 130, product of GE Toshiba Silicone Co., Ltd.) having a volume average particle diameter of 2.6 μm and a particle diameter distribution of 0.90, thereby obtaining an optical sheet according to Example 3.

Example 4

The same binder as used in Example 1 was applied on to one side of the same film as used in Example 1 by a reverse coater so as to give a dry film thickness of 5 μm and then dried at 100° C. for 2 minutes. Thereafter, aging was conducted at 60° C. for 7 days to form a binder layer.

As spherical fine particles, were used polymethyl methacrylate fine particles (trade name: MX-1000, product of Soken Chemical & Engineering Co., Ltd.) having a volume average particle diameter of 10.8 μm and a particle diameter distribution of 0.94, and the transparent substrate, on which the binder layer had been formed, was passed through a fluidized bed in which the spherical fine particles had been contained, thereby attaching the spherical fine particles to the binder layer.

Further, truly spherical zirconia spheres having a particle diameter of 0.5 mm were placed as a pressing medium in a container, and the transparent substrate, to which the spherical fine particles had been attached, was immersed in this container while vibrating this container, thereby embedding the spherical fine particles in the binder layer. After washing is conducted to remove excessive spherical fine particles, aging was conducted for 14 days in a thermostat controlled to 40° C., and the binder layer was cooled to ordinary temperature to obtain an optical sheet according to Example 4.

Comparative Example 1

The same binder as used in Example 1 was applied on to one side of the same film as used in Example 1 by a reverse coater so as to give a dry film thickness of 2.2 μm and then dried at 100° C. for 2 minutes. Thereafter, aging was conducted at 60° C. for 7 days to form a binder layer. Thereafter, the process was performed in the same manner as in Example 1, thereby obtaining an optical sheet according to Comparative Example 1.

Comparative Example 2

The same binder as used in Example 1 was applied on to one side of the same film as used in Example 1 by a reverse coater so as to give a dry film thickness of 1.5 μm and then dried at 100° C. for 2 minutes. Thereafter, aging was conducted at 60° C. for 7 days to form a binder layer. Thereafter, the process was performed in the same manner as in Example 3, thereby obtaining an optical sheet according to Comparative Example 2.

Comparative Example 3

The same binder as used in Example 1 was applied on to one side of the same film as used in Example 1 by a reverse coater so as to give a dry film thickness of 1.5 μm and then dried at 100° C. for 2 minutes. Thereafter, aging was conducted at 60° C. for 7 days to form a binder layer. Thereafter, the process was performed in the same manner as in Example 1 except that the spherical fine particles used were changed to methylsilicone beads having a volume average particle diameter of 4.5 μm and a particle diameter distribution of 0.78, thereby obtaining an optical sheet according to Comparative Example 3.

Comparative Example 4

Polyacrylate (b) was applied on to one side of the same film as used in Example 1 by a reverse coater so as to give a dry film thickness of 1.5 μm and then dried at 100° C. for 2 minutes. Thereafter, aging was conducted at 60° C. for 7 days to form a binder layer. Thereafter, the process was performed in the same manner as in Example 1, thereby obtaining an optical sheet according to Comparative Example 4.

Observation of Optical Sheet

Sections of the optical sheets according to Examples 1 to 4 and Comparative Examples 1 to 4 were photographed through an electron microscope to observe them. Based on each of the photographs, a distance b from the top of the projected fine particles to the surface of the transparent substrate, and a thickness c of the binder layer, which were specified in the present invention, were measured to calculate out a proportion of the distance b from the top of the projected fine particles to the surface of the transparent substrate to the volume average particle diameter a of the spherical fine particles. The results are shown in Table 1.

TABLE 1

| | Volume average particle diameter of spherical fine particles (μm) | Particle diameter distribution | Proportion (*) of distance (%) | Proportion of thickness of binder layer to volume average particle diameter of spherical fine particles (%) |
|---|---|---|---|---|
| Ex. 1 | 4.5 | 0.94 | 108 | 48 |
| Ex. 2 | 10.8 | 0.94 | 101 | 74 |
| Ex. 3 | 2.6 | 0.90 | 110 | 79 |
| Ex. 4 | 10.8 | 0.94 | 104 | 98 |
| Comp. Ex. 1 | 4.5 | 0.94 | 116 | 99 |
| Comp. Ex. 2 | 2.6 | 0.90 | 115 | 85 |
| Comp. Ex. 3 | 4.5 | 0.78 | 106 | 46 |
| Comp. Ex. 4 | 4.5 | 0.94 | 124 | 42 |

(*) Proportion of the distance b from the top of the projected fine particles to the surface of the transparent substrate to the volume average particle diameter of the spherical fine particles.

Test of Optical Properties

Figure 8:
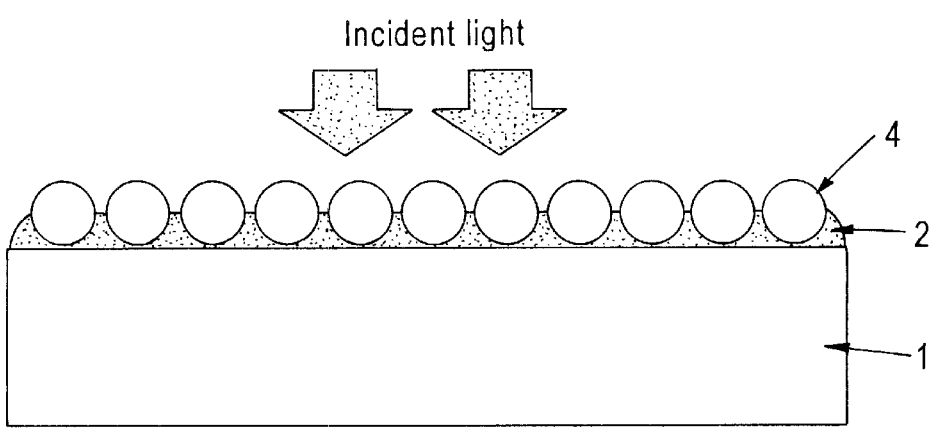
FIG. 8 typically illustrates the direction of incident light to the optical sheet according to the first aspect of the present invention.
Figure 9:
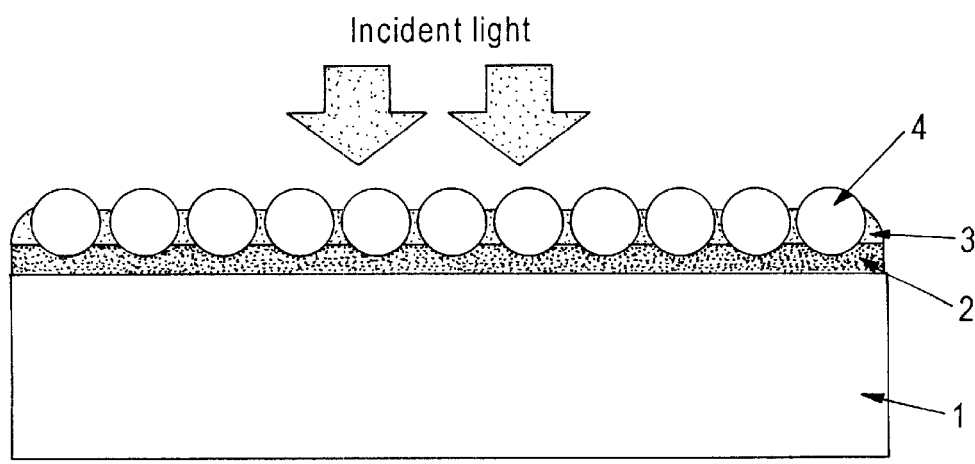
FIG. 9 typically illustrates the direction of incident light to the optical sheet according to the second aspect of the present invention.

With respect to the optical sheets according to Examples 1 to 4 and Comparative Examples 1 to 4, incident light was applied to the sheet composed of the transparent substrate 1, binder layer 2 and spherical fine particles 4 from the front side thereof (referring to FIG. 8) to measure a total light transmittance, Tt (%) and haze, Hz (%) by means of an NDH2000 manufacture by Nippon Denshoku Kogyo K.K.

The optical sheets according to Examples 1 to 4 and Comparative Examples 1 to 4 were left to stand for 7 days under high-temperature and high-humidity conditions (60° C., 90%). Thereafter, Tt and Hz were measured in the same manner as described above to evaluate the optical sheets as to resistance to high temperature and high humidity, i.e., reliability under high-temperature and high-humidity conditions. The measured results are shown in Table 2.

TABLE 2

| | Before left to stand under high temperature and high humidity | | After left to stand under high temperature and high humidity | |
|---|---|---|---|---|
| | Tt (%) | Hz (%) | Tt (%) | Hz (%) |
| Ex. 1 | 98.6 | 89.3 | 97.5 | 88.2 |
| Ex. 2 | 97.5 | 88.2 | 98.0 | 88.7 |
| Ex. 3 | 96.9 | 85.1 | 95.3 | 80.4 |
| Ex. 4 | 99.1 | 80.1 | 99.0 | 73.1 |
| Comp. Ex. 1 | 97.7 | 86.8 | 95.8 | 72.6 |
| Comp. Ex. 2 | 93.9 | 66.0 | 92.9 | 51.3 |
| Comp. Ex. 3 | 96.5 | 89.9 | 95.9 | 75.4 |
| Comp. Ex. 4 | 82.7 | 92.1 | 88.4 | 73.4 |

As apparent from Tables 1 and 2, good optical properties are achieved in all the optical sheets excluding that in Comparative Example 3 when the height from the surface of the substrate to the top of the spherical fine particles is at most 110%, which is close to the diameter of the spherical fine particles. More specifically, the optical properties of the optical sheets according to Examples 1 to 4 of the present invention scarcely varied even after left to stand under high-temperature and high-humidity conditions, and so high light transmission property and light diffusiveness were able to be retained. On the other hand, in the optical sheets according to Comparative Examples 1, 2 and 4 in which the height from the surface of the substrate to the top of the spherical fine particles exceeded 110% of the diameter of the spherical fine particles, and the optical sheet according to Comparative Example 3 in which the particle diameter distribution of the spherical fine particles was 0.78 and smaller than 0.80, Hz was lowered by at least 10% when left to stand under high-temperature and high-humidity conditions. In the optical sheet according to Comparative Example 4, separation of the spherical fine particles was observed (as demonstrated by higher Tt value) after left to stand under high-temperature and high-humidity conditions because the binder high in Tg was used. Therefore, such an optical sheet involved a problem that irregularities occur in optical properties.

Example 5

As a transparent substrate, was used a TAC film (trade name: Fujitack UVD80, refractive index: 1.49, total light transmittance: 92.4%, haze: 0.15, product of Fuji Photo Film Co., Ltd.) having a thickness of 80 μm. A coating formulation obtained by adding a trifunctional isocyanate (trade name: D-90, product of Soken Chemical & Engineering Co., Ltd.; 0.3 parts) to a butyl acrylate type pressure sensitive adhesive (trade name: H-6F, product of Soken Chemical & Engineering Co., Ltd.; 100 parts) and diluting the resultant mixture with methyl isobutyl ketone (hereinafter refereed to as "MIBK") was applied on to one side of this film by a reverse coater so as to give a dry film thickness of 4 μm and then dried at 100° C. for 2 minutes. Thereafter, aging was conducted at 60° C. for 7 days to form a binder layer.

As spherical fine particles, were used methylsilicone fine particles (trade name: Tospearl 145, product of GE Toshiba Silicone Co., Ltd.) having a volume average particle diameter of 4.5 μm and a particle diameter distribution of 0.94. The transparent substrate, on which the binder layer had been formed, was passed through a fluidized bed in which the spherical fine particles had been contained, thereby attaching the spherical fine particles to the binder layer. Thereafter, truly spherical zirconia spheres having a particle diameter of 0.5 mm were placed as a pressing medium in a vibrating container, and the transparent substrate, to which the spherical fine particles had been attached, was immersed in the vibrating container while applying vibrations, thereby embedding the spherical fine particles in the binder layer. After washing is conducted to remove excessive spherical fine particles, aging was conducted for 7 days in a thermostat controlled to 60° C., and the binder layer was cooled to ordinary temperature to form a monoparticle layer of the spherical fine particles.

A coating formulation obtained by diluting a UV-curable acrylate (trade name: UV-3300, product of Toagosei Chemical Industry Co., Ltd.) with a methyl isobutyl ketone (MIBK) was applied on to the binder layer, on which the monoparticle layer of the spherical fine particles had been formed, by a reverse coater so as to give a dry film thickness of 1.0 μm and then dried at 100° C. for 1 minute. Thereafter, hardening by UV was conducted to provide a protective layer to obtain an optical sheet according to the present invention. The film thickness after drying was calculated from the weight and specific gravity of the coating film supposing that the thickness is even.

Example 6

An operation was conducted in the same manner as in Example 5 except that a coating formulation obtained by using a UV curable silicone acrylate (trade name: UVHC-1103, product of GE Toshiba Silicone Co., Ltd.) in place of the UV curable acrylate, and diluting it with n-butanol was applied by a reverse coater so as to give a dry film thickness of 1.1 µm, thereby obtaining an optical sheet according to the present invention.

Example 7

An operation was conducted in the same manner as in Example 5 except that the same UV curable silicone acrylate as that used in Example 6 was applied by a reverse coater so as to give a dry film thickness of 0.8 µm, thereby obtaining an optical sheet according to the present invention.

Example 8

An operation was conducted in the same manner as in Example 5 except that the same UV curable silicone acrylate as that used in Example 6 was applied by a reverse coater so as to give a dry film thickness of 1.6 µm, thereby obtaining an optical sheet according to the present invention.

Example 9

An operation was conducted in the same manner as in Example 5 except that a coating formulation obtained by using polyvinyl acetal (trade name: S-lec KS-10, product of Sekisui Chemical Co., Ltd.) in place of the UV curable acrylate, and diluting it with isopropyl alcohol (IPA) was applied by a reverse coater so as to give a dry film thickness of 0.8 µm, thereby obtaining an optical sheet according to the present invention.

Example 10

A coating formulation obtained by adding a trifunctional isocyanate (trade name: D-90, product of Soken Chemical & Engineering Co., Ltd.; 0.3 parts) to a butyl acrylate type pressure sensitive adhesive (trade name: H-6F, product of Soken Chemical & Engineering Co., Ltd.; 100 parts) and diluting the resultant mixture with MIBK was applied On one side of a transparent substrate composed of a TAC film having a thickness of 80 µm by a reverse coater so as to give a dry film thickness of 4 µm and then dried at 100° C. for 2 minutes. Thereafter, aging was conducted at 60° C. for 7 days to form a binder layer. An TV curable silicone acrylate was applied on to the binder layer so as to give a dry film thickness of 1.0 µm and then dried at 100° C. for 1 minute to form a protective layer.

The transparent substrate, on which the protective layer had been formed, was passed through a fluidized bed in which the same spherical fine particles as those used in Example 5 had been contained, thereby attaching the spherical fine particles to the protective layer. Thereafter, the transparent substrate, to which the spherical fine particles had been attached, was immersed in a vibrating container containing truly spherical zirconia spheres, thereby embedding the spherical fine particles in the protective layer to such an extent that the spherical fine particles come into contact with the binder layer. The protective layer was then irradiated with UV to harden the protective layer, and washing is conducted to remove excessive spherical fine particles, thereby obtaining an optical sheet according to the present invention.

Comparative Example 5

An operation was conducted in the same manner as in Example 5 except that no protective layer was formed in Example 5, thereby obtaining a comparative optical sheet.

Sections of the optical sheets according to Examples 5 to 10 and Comparative Example 5 were photographed through an electron microscope to observe them. In the optical sheets according to Examples 5 to 7 and 10, a part of the individual spherical fine particles were exposed to form projected portions as illustrated in FIG. 4, in the optical sheets according to Examples 8 and 9 on the other hand, projected portions were formed in a state that the surfaces of the spherical fine particles were covered with the protective layer as illustrated in FIG. 5. Incidentally, the optical sheet of Comparative Example 5 was such that no protective layer was provided in FIG. 4.

The optical properties and blocking resistance of the respective optical sheets were evaluated in accordance with the following evaluation methods.

Optical Properties

With respect to the respective optical sheets, incident light was applied to the sheet composed of the transparent substrate 1, binder layer 2, protective layer 3 and spherical fine particles 4 from the front side thereof to measure a total light transmittance, Tt (%) and haze, Hz (%) by means of an NDH2000 manufacture by Nippon Denshoku Kogyo K.K.

The optical sheets were left to stand for 7 days under high-temperature and high-humidity conditions (60° C., 90%). Thereafter, Tt and Hz were measured in the same manner as described above to evaluate the optical sheets as to resistance to high temperature and high humidity, i.e., reliability under high-temperature and high-humidity conditions. In the data before and after left to stand, the reliability is better as a change is less. A great difference between numerical values means that the optical properties are changed by the influence of the environment and that a problem arises on stability.

Blocking Resistance

Each optical sheet sample was cut into sizes of 2×2 cm, a TAC film was placed on the protective layer, and they were held between glass plates to apply a load of 1 kg/cm$^2$ from the above. After this sample was stored in such a state at ordinary temperature for 3 days, the blocking resistance was evaluated by whether the optical sheet sticks to the TAC film or not when the glass plates were removed and the TAC film was held up.

The evaluation results are shown in Table 3.

TABLE 3

| | Before left to stand under high temperature and high humidity | | After left to stand under high temperature and high humidity | | Blocking resistance |
|---|---|---|---|---|---|
| | Tt (%) | Hz (%) | Tt (%) | Hz (%) | test |
| Ex. 5 | 94.9 | 76.7 | 95.0 | 76.4 | A |
| Ex. 6 | 92.8 | 59.1 | 92.4 | 58.9 | A |
| Ex. 7 | 94.3 | 76.3 | 94.8 | 76.2 | A |
| Ex. 8 | 92.9 | 42.8 | 92.7 | 42.8 | A |
| Ex. 9 | 90.1 | 60.7 | 90.6 | 61.4 | A |
| Ex. 10 | 91.4 | 65.3 | 91.4 | 65.8 | A |
| Comp. Ex. 5 | 94.1 | 61.0 | 94.6 | 50.1 | B |

Incidentally, the blocking resistance test in Table 3 was evaluated in accordance with the following standard:

A: No optical sheet stuck to the TAC film.

B: The optical sheet stuck to the TAC film.

As apparent from Table 3, good optical properties and blocking resistance are achieved when the protective layer is provided on the binder layer. More specifically, The optical properties of the optical sheets according to Examples 5 to 10 of the present invention scarcely varied even after left to stand under high-temperature and high-humidity conditions, and so high light transmission property and light diffusiveness were able to be retained. In addition, they did not adhere to any other member. Further, the haze could be controlled with ease by changing the thickness of the protective layer on the binder layer. On the other hand, in the optical sheet according to Comparative Example 5, in which no protective layer was provided on the surface of the binder layer, it was recognized that the haze (Hz) was lowered by at least 10% when left to stand under high-temperature and high-humidity conditions. Such a phenomenon is considered to be attributable to the fact that the binder flows out. Further, the optical sheet involved a problem of blocking that it sticks to another member due to the tackiness of the binder layer, which is required for the attachment of the spherical fine particles.

Example 11

A binder layer and a monoparticle layer of spherical fine particles were formed in the same manner as in Example 5 except that the thickness of the binder layer was changed to 1.5 μm, thereby producing an optical sheet A. The optical properties of this optical sheet A were such that the total light transmittance is 98.6%, and the haze is 89.3%. The section of this optical sheet A was photographed through an electron microscope to observe it. As a result, the proportion of the distance from the top of the projected fine particles to the surface of the transparent substrate to the volume average particle diameter of the spherical fine particles was 108%, and the proportion of the thickness of the binder layer to the volume average particle diameter of the spherical fine particles was 48%. Further, the blocking resistance of the optical sheet A was investigated. As a result, no occurrence of blocking was observed. The optical properties after the test scarcely varied as demonstrated by the fact that the total light transmittance is 97.5%, and the haze is 88.2%. Furthermore, the optical properties of this optical sheet A after left to stand under high-temperature and high-humidity conditions (60° C., 90%) did also not varied, namely, the total light transmittance was 97.5%, and the haze was 88.2%.

A protective layer was then provided on the monoparticle layer of the optical sheet A in the same manner as in Example 5 to produce an optical sheet B. The optical properties of this optical sheet B were such that the total light transmittance is 93.4%, and the haze is 64.5%. The optical properties of the optical sheet B after left to stand under high-temperature and high-humidity conditions were measured. As a result, they scarcely varied, namely, the total light transmittance was 93.6%, and the haze was 65.0%.

Example 12

A binder layer and a monoparticle layer of spherical fine particles were formed in the same manner as in Example 5 except that the thickness of the binder layer was changed to 2.2 μm, thereby producing an optical sheet C. The optical properties of this optical sheet C were such that the total light transmittance is 97.7%, and the haze is 86.8%. The section of this optical sheet C was photographed through an electron microscope to observe it. As a result, the proportion of the distance from the top of the projected fine particles to the surface of the transparent substrate to the volume average particle diameter of the spherical fine particles was 116%, and the proportion of the thickness of the binder layer to the volume average particle diameter of the spherical fine particles was 99%. Further, the blocking resistance of the optical sheet C was investigated. As a result, no occurrence of blocking was observed. However, the optical properties after the test somewhat varied, namely, the total light transmittance was 95.6%, and the haze was 78.1%. Furthermore, the optical properties of this optical sheet C after left to stand under high-temperature and high-humidity conditions also somewhat varied, namely, the total light transmittance was 95.8%, and the haze was 72.6%.

A protective layer was then provided on the monoparticle layer of the optical sheet C in the same manner as in Example 5 to produce an optical sheet D. The optical properties of this optical sheet D were such that the total light transmittance is 93.8%, and the haze is 58.8%. The optical properties of the optical sheet D after left to stand under high-temperature and high-humidity conditions (60° C., 90%) were measured. As a result, they scarcely varied, namely, the total light transmittance was 93.6%, and the haze was 56.7%.

What is claimed is:

1. An optical sheet comprising a transparent substrate and a binder layer laminated directly or through another layer on the transparent substrate, wherein spherical fine particles having a diameter of 1 to 50 μm and a particle diameter distribution of 0.8 to 1.0 are embedded in a state of a monoparticle layer in the binder layer so as to partly project from the surface of the binder layer, and a distance from the top of the projected fine particles to the surface of the transparent substrate is from 100% to 110% of the volume average particle diameter of the spherical fine particles wherein the glass transition temperature of the resin used in the binder layer is from −65° C. to −15° C.

2. The optical sheet according to claim 1, wherein the thickness of the binder layer was from 10 to 90% of the volume average particle diameter of the spherical fine particles.

3. An optical sheet comprising a transparent substrate, and a binder layer and a protective layer successively laminated on the substrate, wherein spherical fine particles having a diameter of 1 to 50 μm and a particle diameter distribution of 0.8 to 1.0 are embedded in the protective layer in such a manner that at least a part of each spherical fine particle comes into contact with the binder layer in a state of a monoparticle layer, and a part of each spherical fine particle projects from the surface of the protective layer to form a projected portion or form a projected portion in a state covered with the protective layer wherein the glass transition temperature of the resin used in the binder layer is from −65° C. to −15° C.

4. The optical sheet according to claim 3, wherein the distance from the top of the projected fine particles to the surface of the transparent substrate is from 100% to 110% of the volume average particle diameter of the spherical fine particles.

5. A process for producing the optical sheet according to claim 3, which comprises the steps of forming a binder layer composed of a material having an adhesive strength of at least 100 g/25 mm on a transparent substrate, attaching spherical fine particles in a state of a monoparticle layer on the surface of the binder layer, and providing a protective layer on the binder layer, on which the spherical fine particles have been attached, in such a manner that projected portions by the spherical fine particles are formed on the surface thereof.

6. A process for producing the optical sheet according to claim 3, which comprises the steps of forming a binder layer composed of a material having an adhesive strength of at least 100 g/25 mm on a transparent substrate, providing a protective layer on the binder layer, attaching spherical fine particles on the surface of the protective layer to form a monoparticle layer, and embedding the spherical fine particles in the protective layer by a pressing medium in such a manner that at least a part of each spherical fine particle comes into contact with the binder layer, and a part of each spherical fine particle projects from the surface of the protective layer.

* * * * *